J. C. FOLEY.
ATTACHMENT FOR CONVERTING A BICYCLE INTO A TRICYCLE.
APPLICATION FILED APR. 16, 1915.
1,167,286.
Patented Jan. 4, 1916.
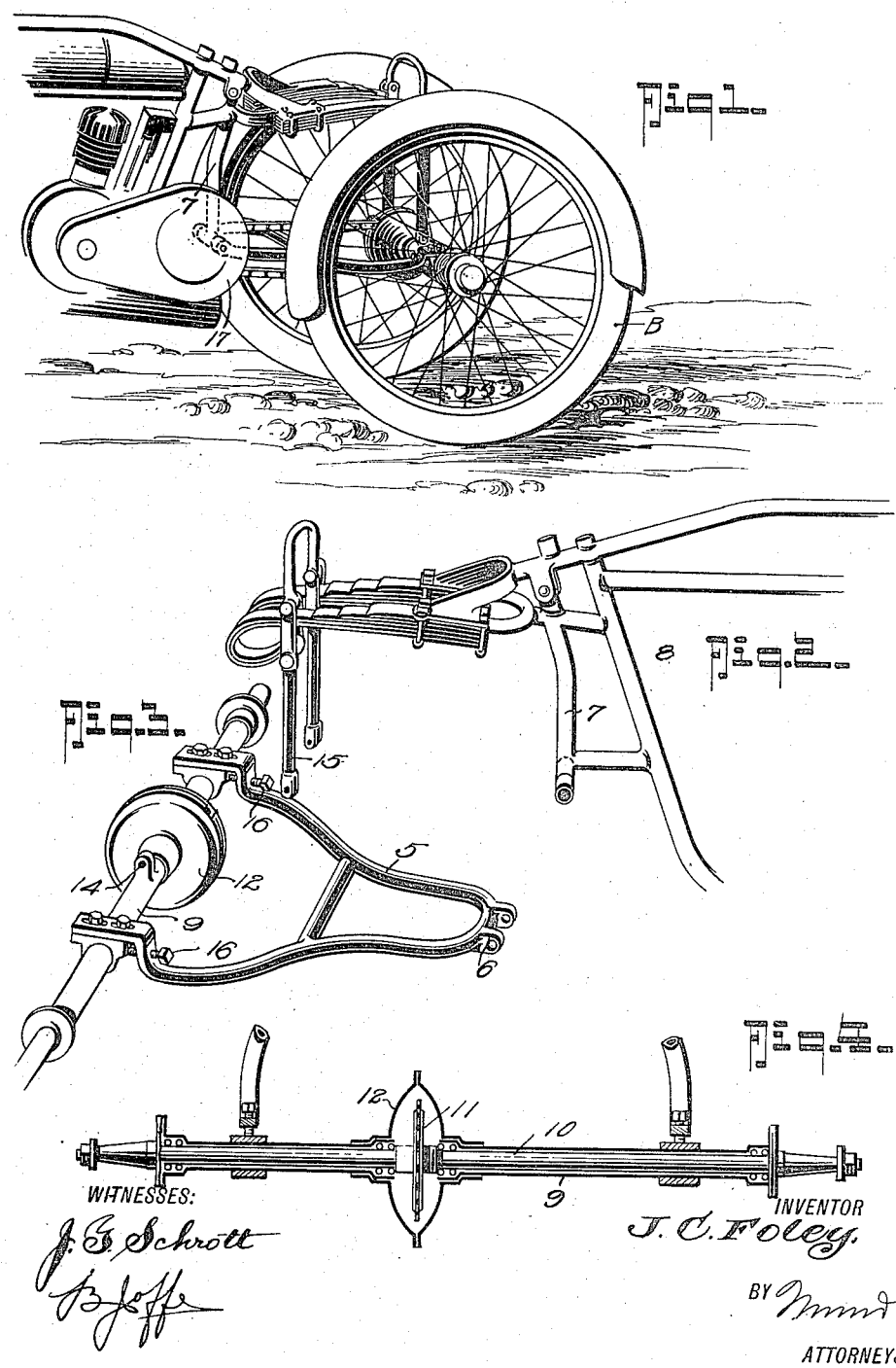

UNITED STATES PATENT OFFICE.

JEREMIAH C. FOLEY, OF NEW YORK, N. Y.

ATTACHMENT FOR CONVERTING A BICYCLE INTO A TRICYCLE.

1,167,286.  Specification of Letters Patent.  Patented Jan. 4, 1916.

Application filed April 16, 1915. Serial No. 21,684.

*To all whom it may concern:*

Be it known that I, JEREMIAH C. FOLEY, a citizen of the United States, and a resident of the city of New York, borough of Bronx, in the county of Bronx and State of New York, have invented a new and Improved Attachment for Converting a Bicycle into a Tricycle, of which the following is a full, clear and exact description.

My invention relates to attachments for converting a bicycle into a tricycle, and it has reference more particularly to motorcycle attachments, and has reference more particularly to an attachment whereby a bicycle can be changed into a tricyle.

The object of the invention is to provide an auxiliary attachment which is simple and inexpensive and whereby the ordinary motorbicycle can be easily and quickly changed into a motortricycle, and vice versa.

The attachment is characterized by the provision of an auxiliary interchangeable rear fork carrying a shaft provided with wheels at each end thereof and with means to be driven from the motor of the cycle.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a perspective view of the rear end of a motorcycle provided with my attachment; Fig. 2 is a perspective view of the cycle frame with the rear fork and mud guard of the cycle removed: Fig. 3 is a perspective view of my auxiliary rear fork forming the attachment whereby the bicycle is transformed into a tricycle; and Fig. 4 is a section through the axle carried by the fork.

Before proceeding to a more detailed description of my invention, it must be clearly understood that although the attachment herein illustrated is shown in connection with an Indian motorcycle, the same can be as efficiently applied, with very slight modification, to any other motorcycle.

Referring to the drawings, 5 represents the auxiliary rear fork which has lugs 6 at the closed end whereby the fork 5 can be attached to the lower end of the rear branch 7 of the motorcycle frame 8. Secured to the open end of the rear fork 5 is a shell or casing 9, the axis of which is in a plane with the fork 5. Mounted to rotate within the shell is an axle 10 the end of which projects out of the ends of the shell 9.

Mounted on the axle to turn therewith is a sprocket 11 which is inclosed in a guard 12 forming part of the shell 9. The ends of the shaft 10 are provided with means for securing the rear wheels 13 thereto so that the same will rotate with the shaft when motion is transmitted thereto by the medium of the sprocket 11. The shell 9 has also lugs 14 for engaging the up-rights 15 of the supporting fork of the motorcycle frame, which in this case are connected to the resilient members of the frame. The shell 9 is so connected at the ends of the fork 5 that the said shell can be moved to and from the closed end by means of screws 16, as indicated in Fig. 3, thus permitting the tightening of the driving chain from the transmission box 17 to the sprocket 11.

When it is desired to transform an ordinary motorcycle, the substantially horizontal rear fork, with the rear wheel and mud guard, are detached from the motorcycle frame by removing the pins associated with the uprights 15 and the rear member 7 and substituting therefor my rear fork 5 with the axle and wheels carried thereby, reinserting the pins which connected the removed fork. From the above it will be seen that the transformation of a bicycle into a tricycle can be easily and quickly made without any alteration in the frame of the motorcycle by simply removing the present substantially horizontal rear fork and substituting my fork therefor.

I claim:

1. A motorcycle attachment comprising a rear fork having means whereby the same can be secured to a motorcycle frame, a rear axle mounted to rotate in said fork, a wheel at each end of said axle mounted to rotate therewith, and means for adjusting said axle in the fork.

2. A motorcycle attachment comprising a fork having means whereby the same can be secured to the motorcycle frame, an axle casing carried by said fork and having means for engaging the motorcycle frame, an axle rotatably mounted within said casing, means carried by said axle whereby the same may be driven, and wheels at each end of said axle mounted to rotate therewith.

3. In combination with a motorcycle frame having a detachable, substantially horizontal rear fork, a casing at the open end of the fork, said casing having means for engaging the motorcycle frame, means for adjusting said casing within the fork, an axle in the casing, means on the axle for rotating the same within the casing and a wheel at each end of said axle mounted to rotate therewith.

4. A motorcycle attachment consisting of a rear fork adapted to be disposed horizontally and having means for detachably securing the same, a casing carried by said fork at the open end thereof, means for adjusting said casing in the plane of the fork, an axle rotatably mounted within said casing, means on said casing for detachably securing the same to the motorcycle, means carried by said axle whereby the same may be driven, and wheels at each end of the axle mounted to rotate therewith.

In testimony whereof I have signed my name to this specification in the presence of two subscribing witnesses.

JEREMIAH C. FOLEY.

Witnesses:
WILLIAM RUMPELTIN,
EDW. J. MOONEY.

Copies of this patent may be obtained for five cents each, by addressing the "Commissioner of Patents, Washington, D. C."